United States Patent
Murphy

(10) Patent No.: US 7,653,352 B2
(45) Date of Patent: Jan. 26, 2010

(54) METHOD AND APPARATUS FOR SELF-ASSIGNING ADDRESSES

(75) Inventor: Daniel T. Murphy, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 592 days.

(21) Appl. No.: 11/315,912

(22) Filed: Dec. 22, 2005

(65) Prior Publication Data

US 2007/0149122 A1 Jun. 28, 2007

(51) Int. Cl.
*H04B 7/00* (2006.01)
(52) U.S. Cl. .................. 455/41.2; 455/415; 455/343.3; 455/418; 455/419; 370/338; 370/328
(58) Field of Classification Search ............... 455/41.2, 455/415, 343.3, 418, 419; 370/338, 328, 370/349
See application file for complete search history.

(56) References Cited

U.S. PATENT DOCUMENTS

| | | | | |
|---|---|---|---|---|
| 6,834,192 | B1* | 12/2004 | Watanabe et al. | 455/444 |
| 6,842,107 | B2* | 1/2005 | Takemura et al. | 340/286.02 |
| 7,245,602 | B2* | 7/2007 | Skubic et al. | 370/338 |
| 7,444,147 | B2* | 10/2008 | Lloyd | 455/434 |
| 2002/0061009 | A1 | 5/2002 | Sorensen | |
| 2002/0131445 | A1* | 9/2002 | Skubic et al. | 370/465 |
| 2003/0043128 | A1* | 3/2003 | Kimura et al. | 345/204 |
| 2003/0080874 | A1 | 5/2003 | Yumoto et al. | |
| 2003/0124978 | A1 | 7/2003 | Virtanen | |
| 2004/0054783 | A1* | 3/2004 | Takemura et al. | 709/227 |
| 2004/0064452 | A1* | 4/2004 | Matsui et al. | 707/9 |
| 2004/0066403 | A1* | 4/2004 | Nagata et al. | 345/748 |
| 2004/0229569 | A1* | 11/2004 | Franz | 455/66.1 |
| 2007/0253345 | A1* | 11/2007 | Habetha et al. | 370/254 |
| 2007/0281735 | A1* | 12/2007 | Suzuki | 455/551 |

\* cited by examiner

*Primary Examiner*—Minh D Dao
(74) *Attorney, Agent, or Firm*—Gary J. Cunningham

(57) ABSTRACT

A method and apparatus for an electronic device 101 operating in a piconet 100 to assign itself a unique identifier 112 is provided. Once the device 101 assigns itself the unique identifier 112, which may be temporary in nature, the device 101 may use the temporary identifier 112 to identify itself to other devices 102-105 operating within the piconet 100, which may be a Bluetooth local area network. In accordance with one embodiment of the method, a device 101 may first scan the piconet 100 to determine device identifiers 113-116 corresponding to devices 102-105 that are operating within the piconet 100. After scanning the device 101 stores the device identifiers 113-116 in a list and queries the list to determine which identifiers are included in the list. The device 101 then selects the temporary, unique identifier 112 that is not found in the list. The unique identifier 112 may then be used to identify the device 101 to the piconet.

20 Claims, 5 Drawing Sheets

METHOD AND APPARATUS FOR SELF-ASSIGNING ADDRESSES

BACKGROUND

1. Technical Field

This invention relates generally to a method and apparatus for self-assigning an identifier, and more particularly to a method and apparatus for self-assigning a unique identifier within a Bluetooth network.

2. Background Art

In recent years, mobile telephones have enjoyed explosive growth in popularity. Once a luxury for only a few, today millions of people use mobile telephones to stay connected with friends, family, and coworkers. Coupled with the rise in popularity of mobile telephones has been the evolution of sophisticated accessories to accompany these phones. For example, the evolution of Bluetooth equipped devices, like headsets and car kits, has expanded the functionality of the mobile telephone by adding wireless speakerphone and control capabilities.

To be sure, Bluetooth devices are appearing everywhere. Bluetooth is a local-area, wireless communication system that allows devices to seamlessly communicate with other devices. A Bluetooth headset, continuing the example from above, may wirelessly couple to a Bluetooth enabled mobile telephone so that a user could operate the mobile telephone in a "hands-free" mode without wires. Similarly, a Bluetooth printer may allow a user to print from a Bluetooth enabled personal computer without the need for bulky cables. As the Bluetooth communication circuitry and protocol is device independent, the Bluetooth enabled mobile telephone could communicate with the Bluetooth enabled personal computer, perhaps to share an address book or photographs.

While the Bluetooth protocol is device independent, when multiple Bluetooth devices are all within communication range, each device in the Bluetooth piconet must be able to distinguish itself from another. A Bluetooth device identifier enables this distinction. In other words, each device has programmed within a device identifier that serves as a piconet identifier/address with which devices may communicate with each other. Traditionally, these addresses are preprogrammed in a factory prior to shipment to an end user.

The problem with Bluetooth device identifiers, however, is that manufacturers prefer to program groups of like devices en mass, to save both time and manufacturing costs. For instance, a manufacturer of Bluetooth headsets for mobile phones may prefer to program ten, twenty, or a hundred or more devices at once. When the devices are first powered up, however, they generally have no device identifier or else they all have the same default device identifier. Consequently, a Bluetooth programming device is unable to distinguish the devices to properly program them.

There is thus a need for a method and apparatus for a Bluetooth enabled device, operating within a piconet, to be able to self-assign a unique device identifier to avoid communication conflicts.

Figure 1:
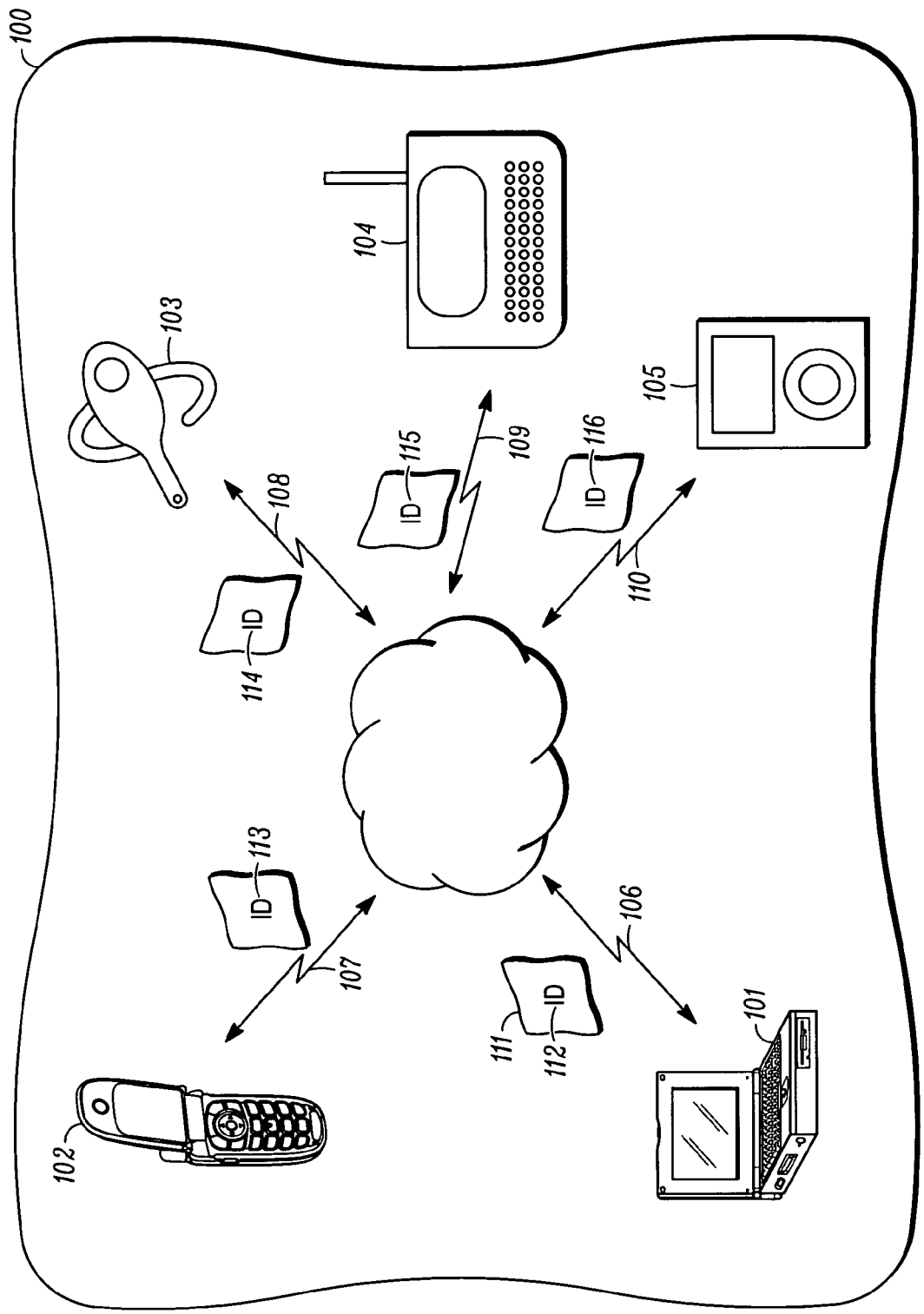
FIG. 1 illustrates devices operating within a piconet in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to self-programming a unique identifier within a piconet. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of self-programming a device identifier across a piconet as described herein. The non-processor circuits may include, but are not limited to, a radio receiver, a radio transmitter, signal drivers, clock circuits, power source circuits, and user input devices. As such, these functions may be interpreted as steps of a method to perform a self-programming of a unique self-identifier. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions.

During a first time power up operation, a Bluetooth enabled device may not include a pre-programmed identifier. Even where a manufacturer of the Bluetooth enabled device plans to program a specific identifier, this preprogramming may not occur until other preliminary programming functions have taken place. Further, it is often advantageous for manufacturers to perform bulk programming of devices to save both time and cost over programming individual devices sequentially.

Thus, a master programming device must have a way to distinguish the unprogrammed devices from each other to complete the programming process.

As described herein, a method and apparatus utilizing Bluetooth Host Controller Interface (HCI) commands allows each device operating within a Bluetooth piconet to self-program a unique identifier as a Bluetooth Device Address (BD_ADDR) so that it may be uniquely identified within the piconet by other Bluetooth devices. The self-programming step may be temporary, as is the case when a programming device will later reprogram a new BD_ADDR. The self-programming allows each device to be identified when operating within the same piconet.

Turning now to FIG. 1, illustrated therein is one example of a Bluetooth piconet 100. A plurality of Bluetooth devices 101-105 operate within the piconet 100 by transmitting messages 106-110 comprising information and commands to each other across the piconet 100. The devices 101-105 may be the same, as would be the case where like devices were being bulk-programmed in a factory. Alternatively, the devices 101-105 may be different, as Bluetooth is a device independent protocol. In either case, each message transmitted, e.g. 111, includes BD_ADDR information, e.g. 112, that is used by the other devices to identify a sending or recipient device. A method for each device to self-program its own, unique BD_ADDR is provided herein to resolve conflicts where either the devices 101-105 have no programmed BD_ADDR or the same BD_ADDR.

In one embodiment, a self-assigning device, e.g device 101, first scans the other devices 102-105 to detect a device identifier (BD_ADDR) 113-116 associated with each of the of devices 102-105. This scanning is accomplished by transmission of a Bluetooth HCI command requesting the other devices 102-105 operating within the piconet 100 to retrieve the device identifier from its BD_ADDR location in memory and to transmit that identifier back to the requesting device.

Once the piconet 100 has been scanned, the received device identifiers 113-116 are stored in the memory of the requesting device 101 as a list. The device 101 then searches the list in memory to determine which device identifiers are included, and then assigns itself internally a unique self identifier that is not found in the list. By way of example, if identifiers "0001," "0002," "0005" and "0008" were in the list, the device 100 may assign itself "0003" as a self identifier, since that identifier is not found in the list. The device 100 may then rescan the piconet 100 to ensure that none of the other devices 102-105 had assigned themselves the same identifier. Where every device 101-105 in the piconet 100 is using a method in accordance with the invention, race and collision conditions are eliminated with this rescanning step.

Figure 2:
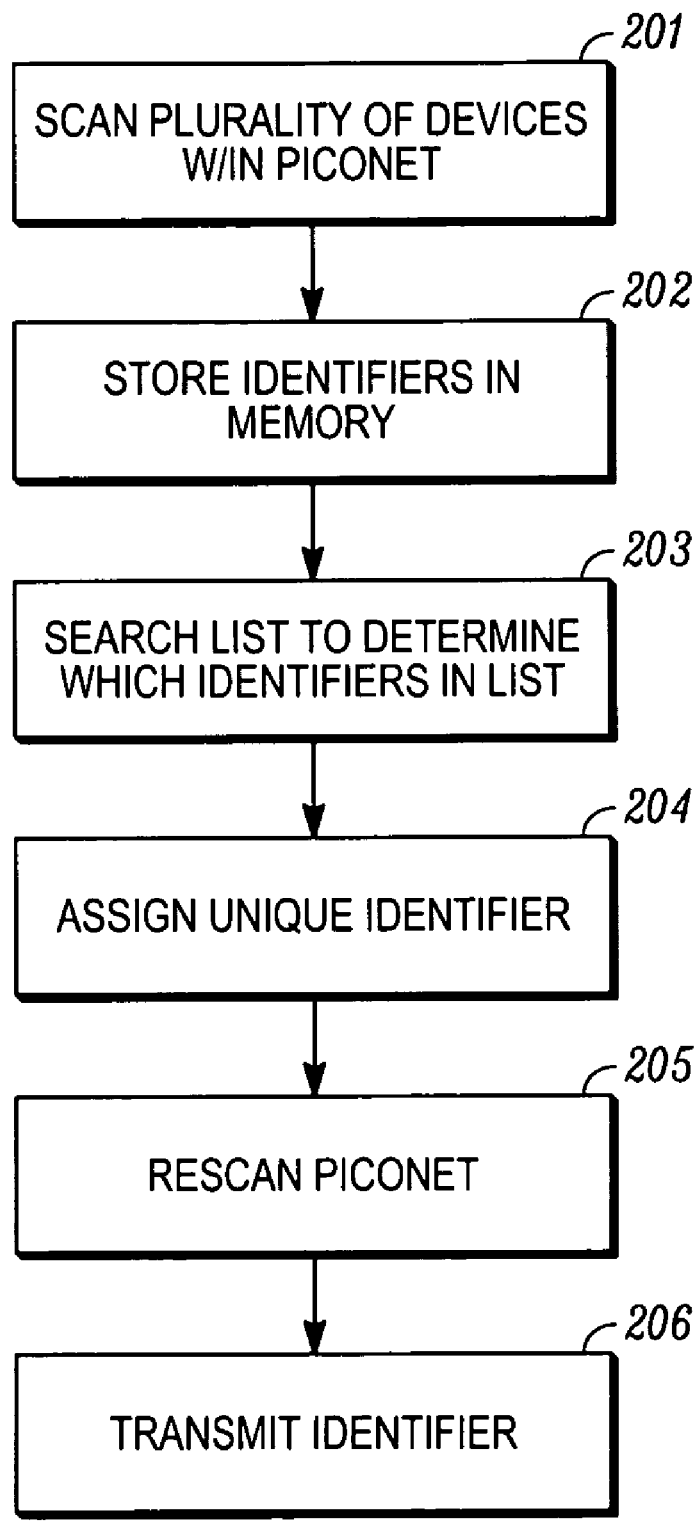
FIG. 2 illustrates one embodiment of a top-level method of self-assigning a device identifier in a Bluetooth environment in accordance with the invention.

Turning now to FIG. 2, illustrated therein is one embodiment of a top-level method of self-assigning a device identifier in a Bluetooth environment, or piconet. Each device operating within the piconet may perform the method to reliably self-assign a unique identifier.

At step 201, a device requiring self-assignment of a device identifier first scans the plurality of devices operating within the piconet. Each device will have a device identifier, regardless of whether it has been programmed. For example, as the device identifier is stored in memory, an unprogrammed device may read a null value at the BD_ADDR location. This null value would then serve as its identifier. The self-assigning device scans the piconet to detect a device identifier associated with each of the other devices.

At step 202, the self-assigning device stores the device identifiers received from the other devices operating within the piconet as a list in memory. These device identifiers may be prioritized or otherwise arranged within in memory. For example they may be prioritized from greatest to lowest, or vice versa. Alternatively, they may be prioritized by type of device or other criteria.

At step 203, the self-assigning device searches the list to determine which identifiers are present in the list. By searching the list, the self-assigning device is able to determine which identifiers have been used by other devices operating within the piconet.

At step 204, the self-assigning device internally assigns itself a unique self identifier that is not found in the list. By way of example, where the self-assigning device has prioritized the devices from greatest to lowest, the self-assigning device may add a value of one, for instance, to the greatest device identifier found in the list, and then assign that sum to itself as a device identifier. Alternatively, the self-assigning device may select an identifier that is unused and that lies between two identifiers found within the list. By selecting an identifier not found in the list, the self-assigning device is assured that it has self-assigned a device identifier not found in the initial scan of the piconet. Note that where the self-assigning device will be later programmed by a programming device, as may be the case in a factory or manufacturing facility on initial power-up, the self-assigned device identifier may be self-assigned only temporarily.

To ensure that no other device operating within the piconet has coincidentally self-assigned the device identifier selected by the self-assigning device, as would be the case where other devices are executing a method in accordance with the invention, at step 205 the self-assigning device rescans each device on the piconet after self-assigning the unique device identifier. In other words, once the self-assigning device has assigned itself a device identifier not found in the list from the initial scan, it rescans the piconet to ensure that no other device has coincidentally selected an equivalent identifier. Where an equivalent device identifier was found during the rescan of the piconet, the self-assigning device may add this identifier to the list and then repeat steps 203 and 204.

As a second check against duplication, at step 206 the self-assigning device may optionally broadcast the unique self identifier to the other devices operating within the piconet. Where another device were executing a self-assigning method in accordance with the invention, that device could add the self-assigning device's device identifier to its list so as not to select the same device identifier.

As noted above, such a method has utility where a manufacturer is initially programming a plurality of devices. Occasionally, such programming will require a reset or other hard start that may alter a preprogrammed device's device identifier. As such, in one embodiment, the method of FIG. 2 may be used to initiate a firmware upgrade. In other words, a firmware upgrade may be initiated after the self-assigning device internally assigns itself the unique device identifier.

Figure 3:
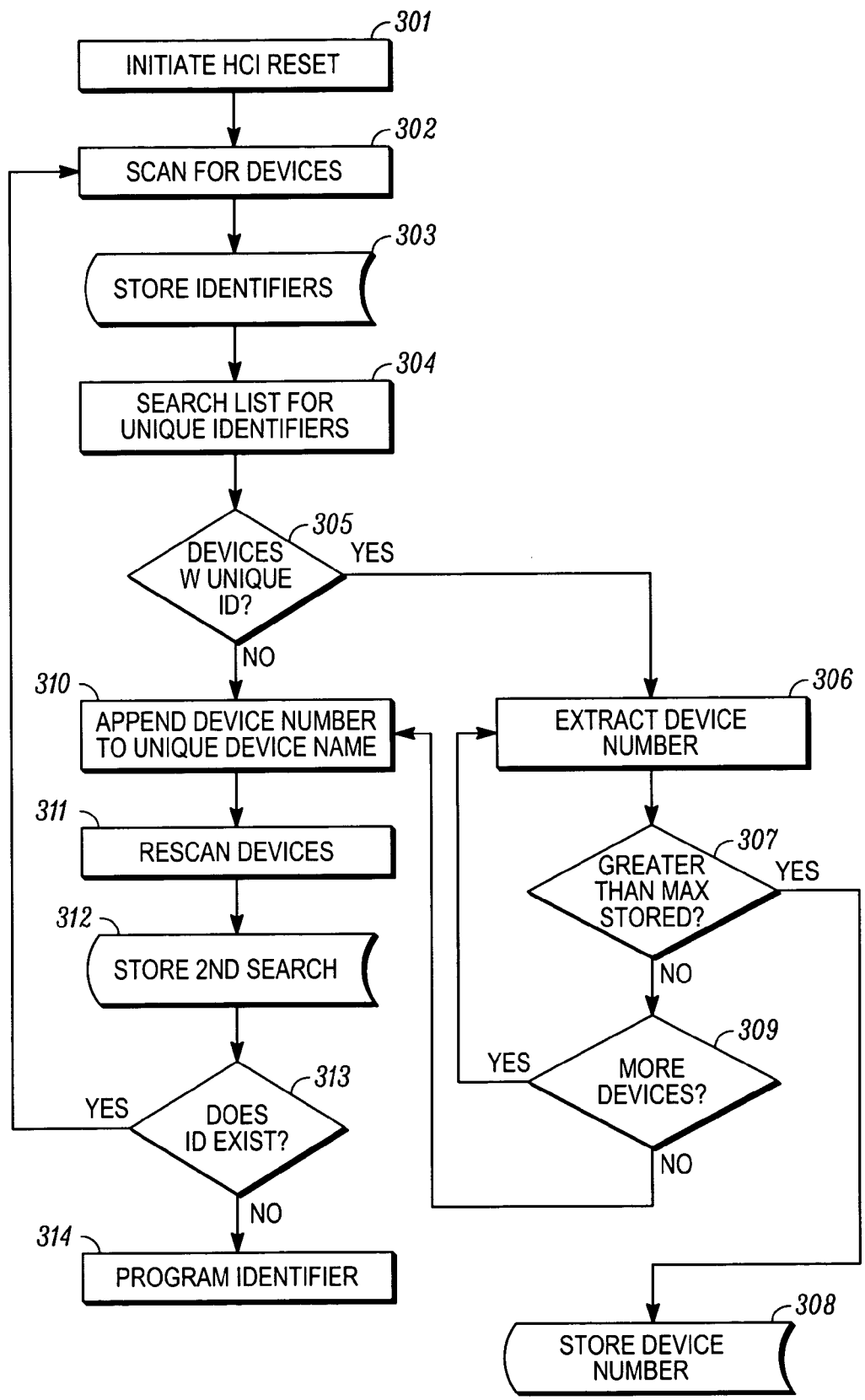
FIG. 3 illustrates an alternate embodiment of a method for of self-assigning a device identifier in a Bluetooth environment.

Turning now to FIG. 3, illustrated therein is an alternate embodiment of a method for of self-assigning a device identifier in a Bluetooth environment. At step 301, a HC_RESET command is sent to each of the devices operating within the Bluetooth environment. The HC_RESET command initiates the devices operating within the piconet so that they may be queried using Bluetooth commands.

At step 302, a self-assigning device initiates a scan of the Bluetooth environment. The scan reads the device identifiers, which in the Bluetooth environment are the BD_ADDRs, from the other devices operating within the Bluetooth environment. These BD_ADDRs are then stored into a buffer, or memory, at step 303. Once the scan is completed, the self-assigning device may disable pairing modules to prevent itself from being paired with another device while the self-assignment of a unique BD_ADDR occurs.

At step 304, the self-assigning device searches through the list of BD_ADDRs to determine whether unique identifiers for its device type exist within the list. For example, if the Bluetooth environment includes a mobile telephone, personal computer and a printer, and the self-assigning device is also a printer, the self-assigning device may find a BD_ADDR for its device type, which is a printer.

In another example, a boot loader within the self-assigning device may require a device identifier of a certain class. Where this is the case, the self-assigning device will search through the list at step 304 to look for BD_ADDRs that are a match with the class required by the boot loader. As BD_ADDRs are generally in the form of a manufacturer code and a numeric code, the self-assigning device may look for certain types of prefixes at step 304 that match the desired class.

Where a match is found at step 305, the device number or numeric code may be extracted and stored at step 306. Since the self-assigning device will include the same prefix, i.e. since it is of the same type as that found at step 305, it will desire to select its own BD_ADDR with that prefix and a unique numeric code. As such, after extracting the numeric code at step 306, the self-assigning device may repeats steps 304 and 305 (as indicated by decision 309), looking for other BD_ADDRs that match its desired class. In one embodiment, each time another is found and the numeric code is extracted and stored at step 306, the most recently extracted code is compared to the one stored before at decision 307. Through each iteration, the greatest numeric code is stored at step 308.

At step 310, the self-assigning device will select a unique BD_ADDR. This may be done in any of a variety of methods, each method yielding a unique BD_ADDR. By way of example, one method is to select the highest device number form the list and to add an integer. If the highest BD_ADDR device number were "0008," the self-assigning device may add one and assign itself "0009" as its unique BD_ADDR device number. It will be clear to those of ordinary skill in the art having the benefit of the disclosure that the invention is not so limited. Other methods could equally be used to select a unique BD_ADDR, including scanning the list for the greatest unused device number, altering the prefix, substituting letters for numbers in the device codes, selecting an identifier that is both greater than a first device identifier stored in the list and less than a second device identifier stored in the list and the like. The unique BD_ADDR device number may then be programmed into the self-assigning device's HCI for transmission to other devices.

Prior to programming the HCI, at step 311, the self-assigning device may rescan the piconet, storing BD_ADDRs found (step 312), to ensure that no other devices operating within the piconet have allocated themselves the BD_ADDR device number selected at step 310. Where the device number has been allocated by another device, as is determined at decision 313, the self-assigning device returns to step 303 and repeats the selection process for a unique BD_ADDR device number. This rescanning step may occur multiple times. Where the BD_ADDR device number is not found, the self-assigning device may program the BD_ADDR into the HCI at step 314.

Figure 4:
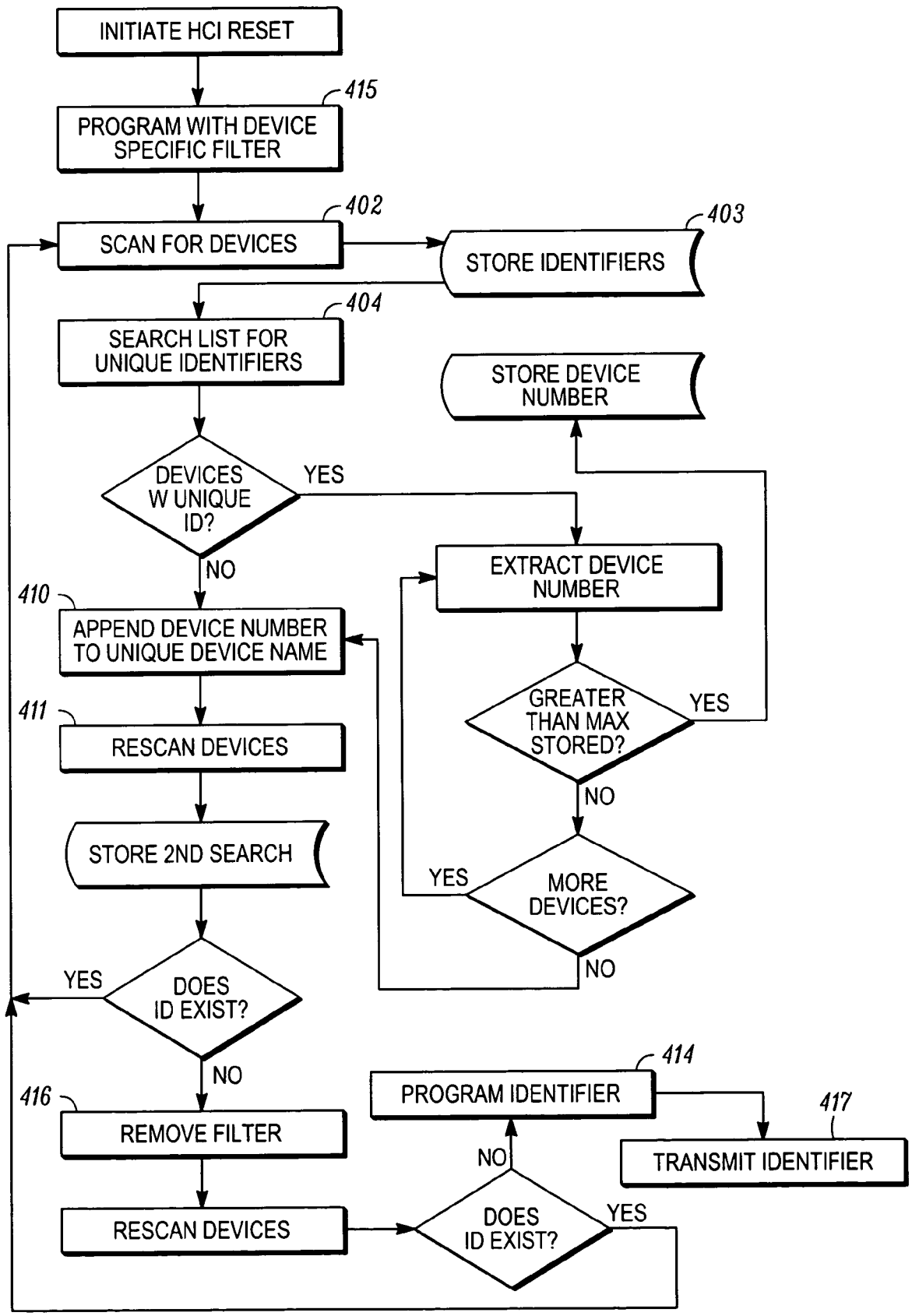
FIG. 4 illustrates an alternate embodiment of a method for a device operating within a piconet to self-assign a unique device identifier in accordance with the invention.

Turning now to FIG. 4, illustrated therein is an alternate embodiment of a method for a device operating within a piconet to self-assign a unique device identifier in accordance with the invention. The embodiment of FIG. 4 employs a device filter, however, to expedite and simplify the scanning process.

Briefly highlighting some of the steps in FIG. 4 that are similar to those found in FIG. 3, at step 402 a self-assigning device polls the piconet to determine device identifiers corresponding to devices operating within the piconet. These device identifiers are stored in a list in memory at step 403. The list is read at step 404 to determine which device identifiers are included in the list. A temporary, unique identifier that is not included in the list is selected at step 410. The piconet is re-polled after the device identifier is selected at step 413 to ensure that the temporary, unique identifier is not in use by another device operating within the piconet. The unique identifier, which may be temporary, is assigned so as to identify the electronic device to the piconet at step 414.

The method of FIG. 4 differs from that of FIG. 3 at steps 415 and 416. Specifically, prior to initially polling the piconet, at step 415 the self-assigning device activates a filter. The filter prevents devices other than those of a specific class from being read during the polling step. By way of example, where a piconet includes devices of differing types, for instance printers, phones and computers, a phone that self-assigns an identifier may only want to poll other phones on the piconet. As such, the phone may enable a filter that only permits the polling of other phones. Likewise, where a device in a factory wants only to program phones, the device may program each phone in the piconet with a filter so that only phones respond when queried. The filter prohibits at least one type of device identifier from being stored in the list.

As with FIG. 3, once a device identifier has been selected, the self-assigning device again polls the piconet at step 411 to ensure another device has not allocated itself the unique identifier assigned by the self-assigning device. In FIG. 4, at step 411, the filter enabled at step 415 is still in place. Consequently, when the self-assigning device polls the piconet at step 411, devices of only a predetermined type will be polled.

As a second check against duplicate device identifiers, at step 416 the filter is deactivated. After deactivating the filter, the self-assigning device may again poll the piconet to ensure that the temporary, unique identifier is not in use by another device operating within the piconet. Provided that the unique device identifier is not found, the self-assigning device may optionally transmit the unique identifier to the piconet at step 417.

As noted above, the self-assignment of a unique identifier may in fact be temporary. Such would be the case upon initial power-up of Bluetooth enabled devices in a factory setting. A control device, also communicating with Bluetooth, may want to query a plurality of devices so as to program them with executable code or other firmware. In accordance with the invention, the devices—regardless of whether they have a device identifier programmed therein—may execute a method to self-assign a temporary, unique identifier to allow a programming device to distinguish the various devices. Upon self-assigning the temporary, unique identifier, a programming device may reprogram a new identifier, may download executable code, or may otherwise upgrade the firmware of the devices operating within the piconet.

Figure 5:
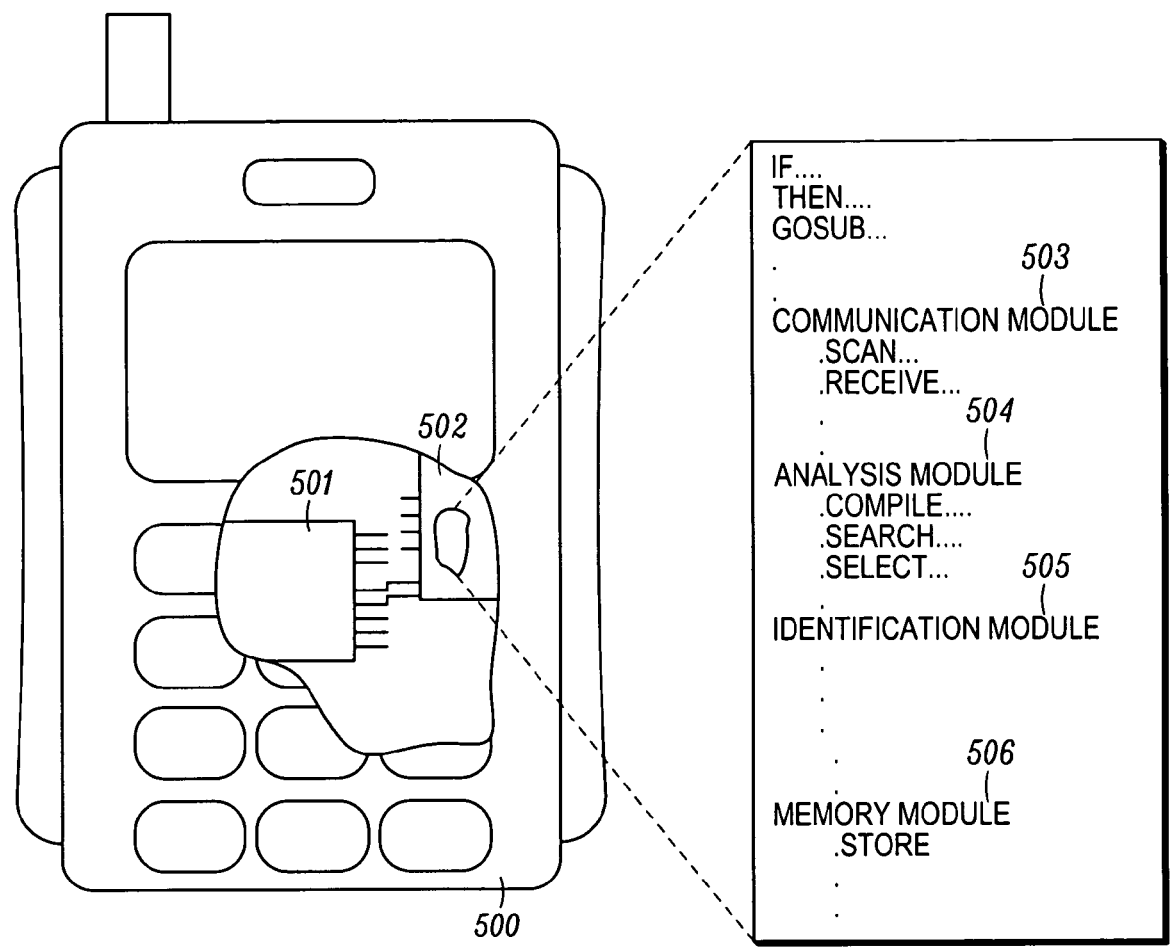
FIG. 5 illustrates one embodiment of a device suitable for operation with one embodiment of the invention.

Turning now to FIG. 5, illustrated therein is one embodiment of a device suitable for operation with one embodiment of the invention. An electronic device 500 having wireless, local area network communication capabilities is provided. The device 500 includes various modules, which may be employed by embedded firmware operating in conjunction with a microprocessor 500 and associated memory 501 to self-assign the device a unique identifier when the device is operating within a local area network having devices with similar initial device identifiers.

The device 500 includes a communication module 503 configured to wirelessly scan a Bluetooth network. Upon scanning the Bluetooth network, the communication module receives a device identifier associated with each device operating within the network.

Once the communication module 503 has scanned the network and has retrieved the device identifiers associated with each device operating within the network, an analysis module 504 is configured to determine which identifiers have been used by other devices operating within the Bluetooth network. The analysis module 504 may accomplish this by first compiling the list of identifiers. The analysis module 504 then searches the list of identifiers to determine which identifiers have been used. After searching, the analysis module 504 selects an identifier not found in the list of identifiers. An identification module 505 then assigns the identifier internally so as to identify the electronic device 500 to the network. The communication module 503 may then once again scan the network to ensure that no other device has selected the same identifier.

As with previous embodiments, the identifier assigned by the identification module 505 may be of temporary duration. As such, the assigned identifier may be active only for less than a predetermined period of time. While within this predetermined period of time, the identifier will be used by the device 500 to identify itself to other devices operating within the local area network. Thus, a memory module 506 may store the identifier for only the predetermined time, but anytime the device 500 receives a query from another device within the predetermined time, the communication module 503 will retrieve the identifier and transmit it to the network.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of self-assigning a device identifier in a Bluetooth environment, the method comprising the steps of:
   a. scanning a plurality of devices, each device having a device identifier, to detect the device identifier associated with each of the plurality of devices;
   b. storing device identifiers associated with each of the plurality of devices as a list in memory;
   c. searching the list to determine which device identifiers are in the list; and
   d. assigning internally a unique self identifier, wherein the unique self identifier is not found in the list.

2. The method of claim 1, wherein the unique self identifier is stored temporarily.

3. The method of claim 1, further comprising the step if activating a filter, wherein the filter causes the step of scanning to scan only devices of a predetermined type.

4. The method of claim 1, further comprising the step of rescanning the plurality of devices after assigning internally the unique self identifier to ensure that none of the plurality of devices has an identifier equivalent to the unique self identifier.

5. The method of claim 4, further comprising the steps of deactivating a filter, wherein the filter causes the step of scanning to scan only devices of a predetermined type, and rescanning the plurality of devices thereafter to ensure that none of the plurality of devices has an identifier equivalent to the unique self identifier.

6. The method of claim 1, wherein the step of assigning internally the unique self identifier comprises selecting a greatest device identifier from the list, adding at least one to the greatest device identifier and selecting a sum of the greatest device identifier and at least one as the unique self identifier.

7. The method of claim 1, further comprising the step of broadcasting the unique self identifier to at least one of the plurality of devices.

8. The method of claim 1, further comprising initiating a firmware upgrade after assigning internally the unique self identifier.

9. A method for an electronic device operating in a piconet to assign itself a temporary, unique identifier, the method comprising the steps of:
   a. polling the piconet to determine device identifiers corresponding to devices operating within the piconet;
   b. storing the device identifiers in a list;
   c. reading the list to determine which device identifiers are included in the list;
   d. selecting the temporary, unique identifier, wherein the temporary, unique identifier is not included in the list; and
   e. assigning the temporary, unique identifier so as to identify the electronic device to the piconet.

10. The method of claim 9, further comprising the step of activating a filter prior to the step of polling, wherein the filter prohibits at least one type of device identifier from being stored in the list.

11. The method of claim 10, further comprising the step of deactivating the filter.

12. The method of claim 11, further comprising the step of polling the piconet after deactivating the filter to ensure that the temporary, unique identifier is not in use by another device operating within the piconet.

13. The method of claim 9, wherein the step of selecting a temporary, unique identifier comprises a step selected from the group consisting of adding an integer to a device identifier stored in the list, selecting an identifier that is greater than a greatest device identifier in the list, and selecting an identifier that is both greater than a first device identifier stored in the list and less than a second device identifier stored in the list.

14. The method of claim 9, further comprising the step of polling the piconet after assigning the temporary, unique identifier to ensure that the temporary, unique identifier is not in use by another device operating within the piconet.

15. The method of claim 9, further comprising the step of downloading an executable code.

16. The method of claim 9, further comprising the step of transmitting the temporary, unique identifier to the piconet.

17. An electronic device having wireless, local area network communication capabilities, the electronic device comprising:
   a. a communication module configured to wirelessly scan a Bluetooth network, thereby receiving a device identifier for each device operating within the Bluetooth network;
   b. an analysis module configured to determine which identifiers have been used in the Bluetooth network by:

i. compiling a list of identifiers; and
　　ii. searching the list of identifiers to determine which identifiers have been used; and
　c. an identification module configured to select an identifier not found in the list of identifiers, wherein the identification module assigns the identifier not found in the list of identifiers internally so as to identify the electronic device to the Bluetooth network.

18. The device of claim 17, wherein the identifier not found in the list is active for less than a predetermined period of time.

19. The device of claim 17, further comprising a memory module capable of storing the identifier not found in the list, wherein, upon receiving a query from another device, the communication module retrieves the identifier not found in the list and transmits it to the Bluetooth network.

20. The device of claim 17, wherein the communication module is configured to rescan the Bluetooth network after the identification module assigns the identifier not found in the list internally.

* * * * *